United States Patent
Kraft et al.

(10) Patent No.: US 11,958,093 B2
(45) Date of Patent: Apr. 16, 2024

(54) FASTENING DEVICE FOR FASTENING A PROCESSING TOOL TO A MACHINE TOOL, TOOL ARRANGEMENT, TOOL MAGAZINE, AND METHOD FOR OPERATING A MACHINE TOOL

(71) Applicant: PASS Stanztechnik AG, Creußen (DE)

(72) Inventors: Stefan Kraft, Schnabelwaid (DE); Andreas Deuerlein, Egloffstein (DE)

(73) Assignee: PASS Stanztechnik AG, Creussen (DE)

( * ) Notice: Subject to any disclaimer, the term of this patent is extended or adjusted under 35 U.S.C. 154(b) by 781 days.

(21) Appl. No.: 17/022,164

(22) Filed: Sep. 16, 2020

(65) Prior Publication Data

US 2021/0078122 A1   Mar. 18, 2021

(30) Foreign Application Priority Data

Sep. 18, 2019 (DE) .................... 10 2019 214 238.9

(51) Int. Cl.
*B21D 28/12* (2006.01)
*B21D 28/14* (2006.01)
*B21D 28/26* (2006.01)
*B21D 28/34* (2006.01)
*B21D 37/14* (2006.01)
*B23P 17/02* (2006.01)

(52) U.S. Cl.
CPC ............ *B21D 28/12* (2013.01); *B21D 28/14* (2013.01); *B21D 28/26* (2013.01); *B21D 28/34* (2013.01); *B21D 37/14* (2013.01); *B23P 17/02* (2013.01)

(58) Field of Classification Search
CPC ............... Y10T 83/929; Y10T 83/8727; Y10T 83/8732; B23P 17/02; B21D 28/12; B21D 28/14; B21D 28/26; B21D 28/34; B21D 28/125; B21D 28/265; B21D 37/17
USPC ..................................................... 72/462, 467
See application file for complete search history.

(56) References Cited

U.S. PATENT DOCUMENTS

| | | | |
|---|---|---|---|
| 5,215,513 A | 6/1993 | Maynard et al. | |
| 2008/0295567 A1* | 12/2008 | Thielges | B21D 28/34 72/482.91 |
| 2009/0320550 A1 | 12/2009 | Lee et al. | |

FOREIGN PATENT DOCUMENTS

| | | |
|---|---|---|
| DE | 4218656 | 12/2008 |
| DE | 202014100456 U1 | 3/2014 |
| DE | 202015100491 U1 | 2/2015 |
| JP | H05228554 A | 9/1993 |
| JP | H1190557 A | 4/1999 |
| WO | 2009158207 A1 | 12/2009 |

OTHER PUBLICATIONS

European Patent Office, Search Report in Application EP20195538.2 of the same family.

* cited by examiner

*Primary Examiner* — Phong H Nguyen
(74) *Attorney, Agent, or Firm* — Smartpat PLC

(57) ABSTRACT

A fastening device for fastening a processing tool to a machine tool, in particular to a press device, comprises at least one locating body, against which the processing tool can be clamped, a clamping unit for the releasable clamping of the processing tool to the at least one counter clamping body, and a locking connection for the releasable connection of the clamping unit to the at least one counter clamping body.

17 Claims, 7 Drawing Sheets

FASTENING DEVICE FOR FASTENING A PROCESSING TOOL TO A MACHINE TOOL, TOOL ARRANGEMENT, TOOL MAGAZINE, AND METHOD FOR OPERATING A MACHINE TOOL

CROSS-REFERENCE TO RELATED APPLICATIONS

This application claims the priority of German Patent Application, Serial No. 10 2019 214 238.9, filed Sep. 18, 2019, pursuant to 35 U.S.C. 119(a)-(d), the content of which is incorporated herein by reference in its entirety as if fully set forth herein.

TECHNICAL FIELD

The disclosure relates to a fastening device for fastening a processing tool to a machine tool, in particular to a press device. The disclosure further-more relates to a tool arrangement having a fastening device of this kind and to a tool magazine having a plurality of such tool arrangements. The disclosure also relates to a method for operating a machine tool.

BACKGROUND

Fastening devices for fastening a processing tool to a machine tool, in particular to a tool turret of a press device, are generally known. Fastening devices of this kind comprise a counter clamping body, against which the processing tool can be clamped, and a clamping unit for the releasable clamping of the processing tool to the counter clamping body. In this case, the clamping unit is screwed to the counter clamping body, whereby the required clamping force is transmitted to the processing tool. The disadvantage is that clamping the processing tool to the counter clamping body and release from the counter clamping body are time-consuming. The time required for the loading and unloading of the processing tool has a disadvantageous effect on the economy of the machine tool in operation.

A tool changing device for changing punches and dies on a turret punch press is known from DE 42 18 656 A1.

SUMMARY

It is an object of the disclosure to provide a fastening device for a machine tool which enables a processing tool to be loaded and unloaded in a manner which is particularly efficient in terms of time and thereby allows particularly economical operation of the machine tool.

The clamping unit is designed to clamp the processing tool to the at least one counter clamping body, in particular by the exertion of a clamping force on the processing tool. In other words, the clamping unit makes available a clamping force for clamping the processing tool against the at least one counter clamping body. The clamping unit thus brings about nonpositive fastening of the processing tool on the counter clamping body. The advantage is that, as a result, the processing tool can be fastened precisely and without play to the counter clamping body. In particular, the clamping unit ensures the compensation of dimensional tolerances between the processing tool and the at least one counter clamping body and/or the clamping unit.

The clamping unit is preferably designed in such a way that the clamping force on the processing tool acts at an angle, in particular perpendicularly, to a processing direction in which the processing tool interacts with the workpiece.

The clamping unit and the locking connection can be designed in such a way that the provision of the clamping force and the connection of the clamping unit to the at least one counter clamping body can be accomplished independently of one another. It is thereby advantageously ensured that, to connect the clamping unit to the at least one counter clamping body, it is not first necessary to overcome the clamping force. The processing tool can thus be fastened on the machine tool in a particularly simple manner and with little expenditure of force. The clamping unit is preferably designed to provide a clamping force which is oriented in an assembly direction of the clamping unit during connection to the counter clamping body, said assembly direction being reversibly blocked by the locking connection.

The clamping unit can have a tool engagement feature, via which the required energy for the provision of the clamping force can be transmitted to the clamping unit.

According to one aspect of the disclosure, the at least one counter clamping body and the clamping unit each surround the processing tool in some section or sections, in particular alternately, in particular around a central longitudinal axis of the processing tool oriented parallel to the processing direction. The processing tool can thus be fastened in a particularly secure and reliable manner on the machine tool.

The fastening device is preferably designed for the reversibly releasable fastening of a single processing tool. It is preferable if precisely one processing tool can be clamped between the counter clamping body and the clamping unit. As an alternative, the fastening device can be designed for fastening a plurality of processing tools on the machine tool.

The machine tool is preferably a press device, in particular a punching device and/or forming device. Even more preferably, the machine tool is a turret punch press. The machine tool preferably comprises a tool magazine, in particular a turret magazine. The fastening device according to the disclosure has a particularly positive effect on the economy of a machine tool of this kind in operation.

The at least one locking element can be a locking bolt and/or a locking plate and/or a parallel key. The at least one locking element can be brought into engagement with the at least one locking engagement feature by, in particular exclusively, linear movement and/or pivoting, in particular a pivoting movement of at most 360°, in particular at most 180°. The locking connection is preferably designed in such a way that forces acting along a positive locking direction used for the locking connection act exclusively perpendicularly to an actuating direction of the at least one locking element. The actuating direction is taken to mean the direction in which the at least one locking element is moved to close the locking connection. A screwed joint is not a locking connection in the sense according to the disclosure.

At least two, in particular all, of the locking elements are preferably connected to one another, in particular rigidly. According to one aspect of the disclosure, the at least two locking elements are mounted on a common lock carrier, in particular by positive engagement, in particular by means of fixing pins. The lock carrier can be designed, by means of its position relative to the clamping unit and/or the at least one counter clamping body, to indicate to the user whether the locking connection is in a closed position.

The clamping unit can be designed to provide a clamping force oriented perpendicularly to the processing direction. The processing direction is taken to mean a direction in which the processing tool interacts with the workpiece, in particular a punching and/or forming direction. The at least one counter clamping body preferably overlaps the processing tool at least partially, in particular completely, perpendicularly to a processing direction. The clamping of the processing tool preferably takes place perpendicularly to the processing direction. Even more preferably, the at least one counter clamping body is designed in such a way that the processing tool can be removed from the counter clamping body parallel to the processing direction and/or in at least one direction perpendicular to the processing direction. It is thereby advantageously achieved that the processing tool can be removed from the fastening device in an easily handled manner, even in greatly restricted space conditions.

The clamping unit can preferably be removed completely from the counter clamping body. In particular, the clamping unit can be reversibly connectable to the counter clamping body along a joining direction oriented transversely to the processing direction and/or oriented parallel to a clamping direction. The connection of the clamping unit to the at least one counter clamping body can be accomplished by direct mounting on the counter clamping body or via an intermediate element. The clamping unit preferably surrounds the processing tool together with the at least one counter clamping body in positive engagement in all directions transversely to the processing direction. This positive engagement can be cancelled, preferably at least in one direction, by the reversible removal of the clamping unit from the at least one counter clamping body. In an open position, the processing tool can thus be removed from the counter clamping body transversely to the processing direction. The clamping unit can be part of a clamping shoe.

According to another aspect of the disclosure, the fastening device is of substantially rotationally symmetrical design with respect to the processing direction. The clamping unit preferably complements the at least one counter clamping body to form the rotational symmetry.

According to one aspect of the disclosure, the fastening device comprises a fastening main body for connecting the at least one counter clamping body to the machine tool, in particular the tool magazine. The at least one counter clamping body is preferably positively and/or nonpositively connectable, in particular reversibly, to the fastening main body.

In particular, an actuating path for the closure of the locking connection can be particularly small. A ratio of an engagement depth of the completely closed locking connection along the actuating direction and an engagement width transversely to the actuating direction is preferably no more than 10, in particular no more than 5, in particular no more than 3, in particular no more than 1. The engagement depth and the engagement width relate to an overlap region of the locking connection in the direction of the positive engagement used, in particular transversely to the actuating direction.

A fastening device, wherein the clamping unit and at least one locking element of the locking connection and/or at least one locking engagement feature of the locking connection are mounted on a closing body, can be handled in a manner which is particularly simple and efficient in terms of time. By virtue of the fact that the clamping unit and/or the at least one locking element and/or the at least one locking engagement feature of the locking connection are/is mounted in a captive manner on the closing body, the number of components to be handled is reduced. In particular, it is sufficient to move a single component, namely the closing body, up to the counter clamping body. The closing body can interact as a ring completion element with the at least one counter clamping body. In particular, the closing body is designed as a clamping shoe.

The at least one locking element is preferably mounted movably on the closing body. For this purpose, the closing body can comprise at least one locking element bearing arrangement, in particular at least one locking element hole.

A fastening device, wherein the locking connection comprises a latching connection for the latching connection of the clamping unit to the at least one counter clamping body, is particularly simple to handle and ensures the clamping of the processing tool to the counter clamping body in a particularly reliable manner. At least one locking element is preferably designed for latching connection to at least one locking engagement feature. For this purpose, the at least one locking element preferably has a latching chamfer. By means of the latching chamfer, the locking element for latching connection to the locking engagement feature can be moved into an open position without separate actuation of the locking engagement feature. By virtue of the design of the locking connection as a latching connection, unwanted release of this connection can be reliably prevented. The latching connection can be arranged in the clamping position in a manner which is particularly resistant to vibratory movements.

The latching connection preferably comprises at least one locking spring for preloading the at least one locking element into the closed position.

A fastening device comprising a linear guide for limiting the movability of the clamping unit relative to the at least one counter clamping body along a joining direction, is particularly robust in operation. By means of the linear guide, misalignment of the clamping unit relative to the at least one counter clamping body can be reliably prevented. By virtue of the fact that the clamping unit is movable exclusively along the joining direction, the connection between the clamping unit and the at least one counter clamping body is particularly rigid and robust. The linear guide preferably comprises two, in particular at least three, in particular at least four, guide supports between the clamping unit, in particular the closing body, and the at least one counter clamping body. It is preferable if at least three of the guide supports are not arranged collinearly with respect to one another.

According to one aspect of the disclosure, the linear guide can have a slot and key joint and/or a plug-in joint. A fastening device of this kind can be produced particularly economically and is robust in operation. The slot and key joint preferably comprises a T-shaped slot, in particular a T-shaped slot connected to the at least one counter clamping body, and at least one sliding element connected, in particular, to the clamping unit, in particular to the closing body. A position of the at least one sliding element relative to the clamping unit, in particular the closing body, is preferably adjustable transversely to the joining direction of the slot and key joint. This ensures that the sliding element can be connected to the guide slot in a manner which is particularly free from play. The slot and key joint is preferably designed as a play-free taper key joint.

The plug-in joint preferably comprises a guide pair, in particular a guide hole, and a guide shaft interacting therewith, in particular a guide pin. According to one aspect of the disclosure, the linear guide comprises precisely two of the slot and key joints and precisely two of the plug-in joints.

A fastening device, wherein the clamping unit has at least one spring means, via which a clamping force for clamping the processing tool is transmitted, is particularly robust and reliable in operation. In particular, the at least one spring means ensures compensation of fluctuations of a clamping dimension of the processing tool. The clamping dimension is the dimension of the processing tool which is measured between the at least one counter clamping body and the clamping unit. The fastening device is thus particularly tolerant towards varying clamping dimensions, in particular due to manufacturing tolerances and/or wear. The at least one spring means can be designed as a spiral spring or as a bending spring, in particular as a leaf spring. The clamping unit preferably comprises a plurality of the spring means.

According to one aspect of the disclosure, the at least one spring means can have at least one spring-elastic solid body joint to provide the spring effect. A fastening device of this kind can be implemented in a manner which is particularly economical in terms of installation space. The at least one solid body joint can be integrated into the clamping unit in a particularly simple manner. The at least one solid body joint is preferably formed by at least one slot in a clamping element, via which the clamping force is transmitted to the processing tool. To improve the spring effect and to reduce stress peaks, the at least one slot preferably opens in each case into a hole delimiting the solid body joint.

A fastening device, wherein the locking connection comprises at least two locking elements and/or the clamping unit comprises at least two clamping elements for clamping the processing tool to the at least one locating body, ensures particularly stable fastening of the processing tool. By means of the at least two locking elements and/or the at least two clamping elements, tilting of the locking connection around the actuating direction of the locking elements and/or movement of the processing tool in the processing direction are/is reliably prevented. The processing tool is enclosed securely and stably between the at least two clamping elements, which are held by the at least two locking elements.

A fastening device, wherein the clamping unit comprises an actuating engagement feature for the manually operated movement of the fastening device between a clamping position and an open position, can be actuated in a particularly simple manner. The actuating engagement feature can be designed for rotary driving and/or linear driving of the clamping unit. For example, the actuating engagement feature can be designed as a tool engagement feature, in particular as an internal hexagon engagement feature, or as a hand lever or as a hand slide.

A fastening device, wherein the clamping unit comprises an eccentric shaft having a clamping eccentric portion for converting a drive torque into a clamping force for clamping the processing tool, can be implemented in a particularly compact manner and allows the application of particularly high clamping forces. The clamping eccentric portion preferably comprises at least one, in particular at least two, eccentric cams. By means of the height of the eccentric cam relative to an eccentric base, a transmission ratio between an actuating torque and the resulting clamping force can be adjusted. A ratio between a clamping radius of the eccentric cam for transmitting the clamping force in the clamping position and an opening radius of the eccentric base for the release of the processing tool is preferably at most 2, in particular at most 1.5, in particular at most 1.2, in particular at most 1.1, in particular at most 1.05. Particularly high clamping forces can thereby be achieved.

According to one aspect of the disclosure, the eccentric shaft can have an opening eccentric portion for moving the locking device out of a clamping position into an open position. A fastening device of this kind can be implemented in a particularly compact way and is simple to handle. The opening eccentric portion preferably interacts with the at least one locking element, in particular with the lock carrier. According to another aspect of the disclosure, the opening eccentric portion has a rotation stop for limiting a rotary motion of the eccentric shaft. The rotation stop preferably interacts with the at least one counter clamping body.

A fastening device, wherein the clamping unit has a stable position in a clamping position, in which the processing tool is clamped to the counter clamping body, is particularly robust in operation and ensures the fastening of the processing tool in a particularly reliable manner. By virtue of the fact that the clamping unit has the stable position in the clamping position, in which the processing tool is clamped to the at least one counter clamping body, the clamping unit cannot be moved into the open position without having to provide a minimum amount of energy to overcome the stable position. Even under the effects of vibration which occur to a considerable degree, especially during punching, the clamping unit remains reliably fixed in the clamping position.

According to one aspect of the disclosure, the stable position of the clamping unit is ensured by the shaping of the clamping eccentric portion. The clamping position of the eccentric shaft is preferably formed between a rotation stop, in particular the rotation stop of the opening eccentric portion, and a dead centre of the at least one eccentric cam. At the dead centre, the radius of the clamping eccentric portion and thus the clamping force has an at least local maximum. In particular, the dead centre radius is larger than the clamping radius.

A fastening device, wherein the clamping unit comprises at least one deflection means for deflecting a driving movement by at least 45° into a clamping movement acting on the processing tool, can be implemented in a particularly compact way. The deflection means is preferably mounted so as to be rotatable about a deflection axis. The deflection axis can be oriented parallel to the processing direction. A drive-side movement is deflected into the clamping movement by means of the deflection means, preferably by at least 45°, in particular by at least 60°, in particular by at least 90°, in particular by at least 100°.

According to one aspect of the disclosure, the at least one deflection means and the at least one spring means can be of one-piece design. A fastening device of this kind can be implemented in a particularly compact and economical manner. By virtue of the fact that the at least one deflection means and the at least one spring means are of one-piece, in particular integral, design, the installation space taken up by these components can be reduced. In particular, the mounting and attachment of the at least one deflection means and of the at least one spring means can be simplified. The at least one spring means is preferably in the form of solid body joints in the deflection means.

According to another aspect of the disclosure, a linear contact body can be provided for driving the at least one deflection means, which body is in linear contact with the at least one deflection means during the movement of the clamping unit out of an open position into a clamping position. A fastening device of this kind is particularly wear-resistant. The linear contact body is preferably arranged on the eccentric shaft, in particular between the eccentric shaft and the deflection means. An eccentric axis, around which the eccentric shaft is rotatably mounted, is preferably arranged perpendicularly to a deflection axis, around which the deflection means is rotatably mounted. By virtue of the fact that the linear contact body is arranged between the eccentric axis and the deflection means, it is possible to ensure that the force transmission between the eccentric shaft and the deflection means takes place via a linear contact. The force transmission within the clamping unit and relative to the processing tool, preferably takes place exclusively via linear contact and/or surface contact. By virtue of the fact that point contact is avoided during the transmission of the clamping force, the fastening device is considerably more resistant to wear.

The linear contact body is preferably of rectangular cross section, in particular of cuboidal cross section. According to one aspect of the disclosure, the linear contact body is mounted in a floating manner. The linear contact body can be made of a sliding bearing material, in particular of bronze.

A fastening device comprising at least one retaining means for fixing the clamping unit in a clamping position and/or an open position, can be handled in a particularly simple manner and is reliable in operation. The retaining means is preferably designed for positive-locking fixing of the clamping unit in the clamping position and/or the open position. The retaining means preferably comprises a latching connection. The retaining means can comprise a retaining body preloaded by a spring force. The retaining means is preferably designed as a pressure piece.

According to one aspect of the disclosure, the fastening device can have at least one disengagement spring for bringing about a disengagement force that acts between the at least one counter clamping body and the clamping unit. A fastening device of this kind is particularly simple to handle. The disengagement spring is preferably mounted on the at least one counter clamping body and/or on the closing body. The at least one disengagement spring preferably causes a disengagement force on the clamping unit, in particular the closing body, which acts counter to the joining direction.

A fastening device, wherein the processing tool is a press die, in particular a punching die or a forming die, is particularly robust and can be operated economically. Press dies are subject to particularly high static and dynamic loads in operation. At the same time, the installation space is severely restricted owing to the necessity of avoiding long stroke travels of the press punch interacting therewith along the processing direction. The fastening device ensures particularly reliable clamping of the processing tool, especially under dynamic loads, and simple mounting of the processing tool transversely to the processing direction. The fastening device is accordingly particularly advantageous for fastening press dies.

Another object of the disclosure is to provide a tool arrangement for a machine tool which can be handled in a particularly economical and simple manner in operation.

This object is achieved by a tool arrangement for a machine tool, in particular a press device, having an inventive fastening device, and a processing tool for processing a workpiece, wherein the clamping unit is releasably connected to the at least one counter clamping body by means of the locking connection, and wherein the processing tool is releasably clamped to the at least one counter clamping body by means of the clamping unit. The advantages of the tool arrangement according to the disclosure correspond to the advantages of the fastening device described above. The tool arrangement according to the disclosure can be exchanged and maintained in a particularly economical manner. A machine tool equipped with this tool arrangement is correspondingly economical to operate.

Another object of the disclosure is to provide a tool magazine which can be operated in a particularly economical manner.

This object is achieved by a tool magazine having a magazine main body, and a plurality of tool arrangements according to the disclosure mounted on the magazine main body. The advantages of the tool magazine according to the disclosure correspond to the advantages of the tool arrangement described above and of the fastening device described above. Tool magazines are designed to hold a multiplicity of processing tools. The tool magazine with the tool arrangement according to the disclosure can be operated in a particularly economical manner by virtue of the large number of processing tools that can be exchanged in a quick and simple manner.

According to one aspect of the disclosure, the magazine main body can be designed as a tool turret. A tool magazine of this kind can be operated in a particularly economical manner. By virtue of the fact that the magazine main body is designed as a tool turret, there is very limited installation space available for the mounting of the processing tool. In particular, the processing tool cannot be moved up to the at least one counter clamping body along the processing direction. The tool magazine with the tool arrangement according to the disclosure makes it possible to insert the processing tool transversely to the processing direction. Thus, mounting of the processing tool can take place in a simple manner even in the installation space severely restricted by the tool turret.

The disclosure is furthermore based on the object of providing a method for operating a machine tool which is particularly robust and economical.

This object is achieved by a method for operating a machine tool, comprising the following steps: providing a machine tool having a fastening device according to the disclosure, providing a processing tool for processing a workpiece, arranging the processing tool at the at least one counter clamping body, arranging the clamping unit at the at least one counter clamping body, closing the locking connection to connect the clamping unit to the at least one counter clamping body, clamping the processing tool to the at least one counter clamping body by means of the clamping unit, and processing the workpiece by means of the processing tool. The advantages of the method according to the disclosure correspond to the advantages of the tool magazine already described, of the tool arrangement and of the fastening device. The closure of the locking connection is preferably performed by a linear movement and/or a pivoting movement. It is thereby advantageously ensured that the connection of the clamping unit to the at least one counter clamping body can take place in a manner which is particularly efficient in terms of time, as a result of which the operation of the machine tool is particularly economical.

Further features, advantages and details of the invention will become apparent from the following description of an exemplary embodiment.

DETAILED DESCRIPTION

Figure 1:
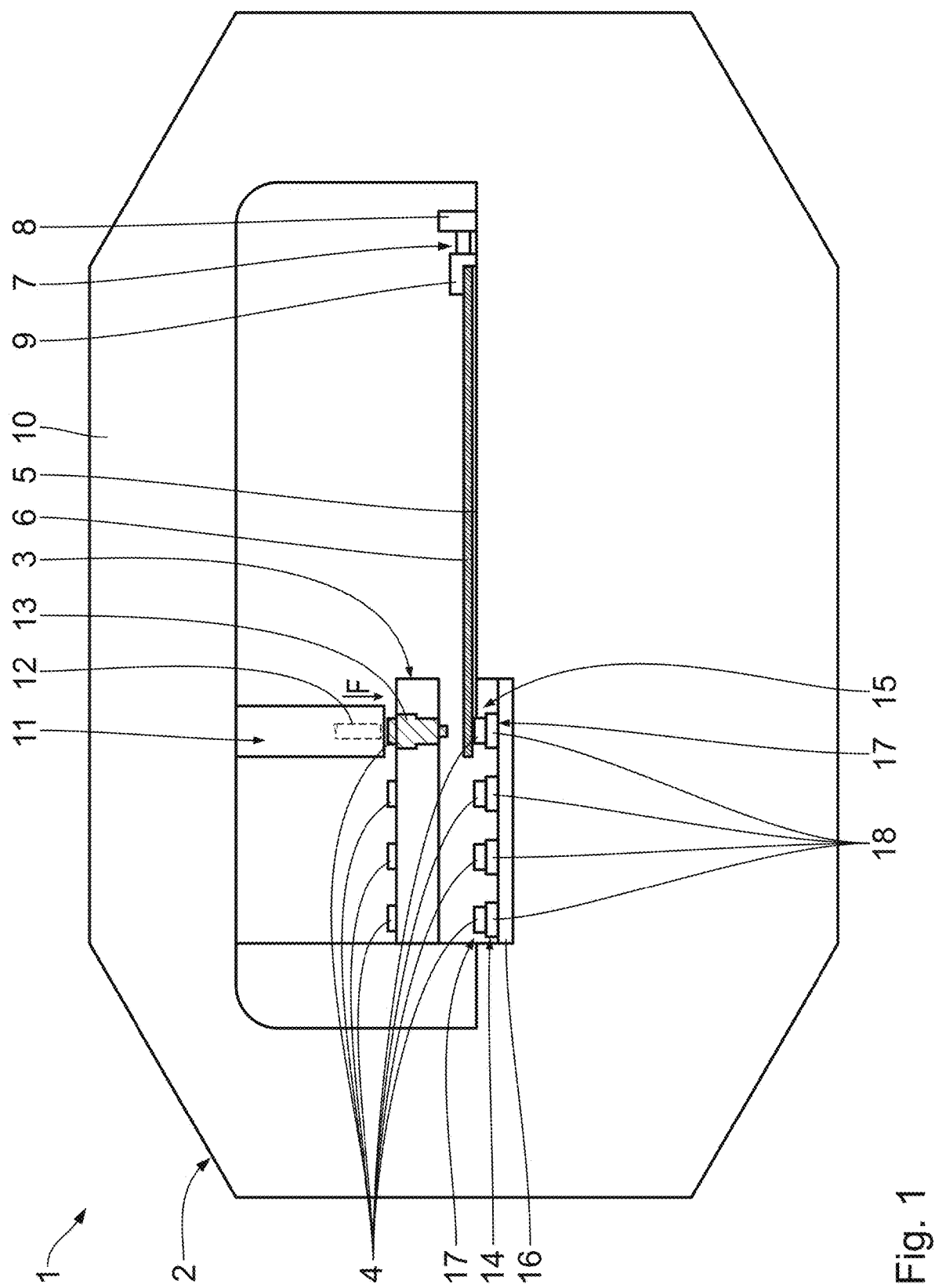
FIG. 1 shows a schematic side view of a machine tool having a tool magazine that has a plurality of tool arrangements, each having one processing tool for processing a workpiece.

FIG. 1 illustrates a machine tool 1 having a frame structure 2, a tool magazine 3 connected thereto and having a plurality of processing tools 4, a work table 5 for supporting a workpiece 6 to be processed, and a positioning device 7 for moving the workpiece 6 relative to the work table 5. The workpiece 6 is a sheet, in particular a metal sheet. The positioning device 7 comprises a positioning drive 8, which is connected to a clamping means 9. The workpiece 6 is secured reversibly on the clamping means 9 and can be moved relative to the work table 5 by means of the positioning drive 8.

An actuating device 11 is arranged on a frame upper part 10 of the frame structure 2. The actuating device 11 comprises a ram 12 for driving a processing tool 4, which is designed as a punch 13, arranged below the ram 12. A processing tool 4 designed as a punching die 14 is arranged on the tool magazine 3. The punching die 14 is arranged opposite the punch 13 in relation to the workpiece 6. The punch 13 and the punching die 14 interact as a tool pair 15 during the processing of the workpiece 6.

A plurality of tool arrangements 17 is mounted on a magazine main body 16 of the tool magazine 3. The tool arrangements 17 each comprise one of the punching dies 14 and a fastening device 18 for connecting the punching die 14 to the magazine main body 16 of the machine tool 1.

The tool magazine 3 is connected in a rotatably drivable manner to the frame structure 2. The active tool pair 15 can be selected from a plurality of tool pairs 15 arranged on the tool magazine 3, and, for processing the workpiece 6, can be positioned in a vertical direction below the ram 12 by driving the tool magazine 3 in rotation.

Figure 2:
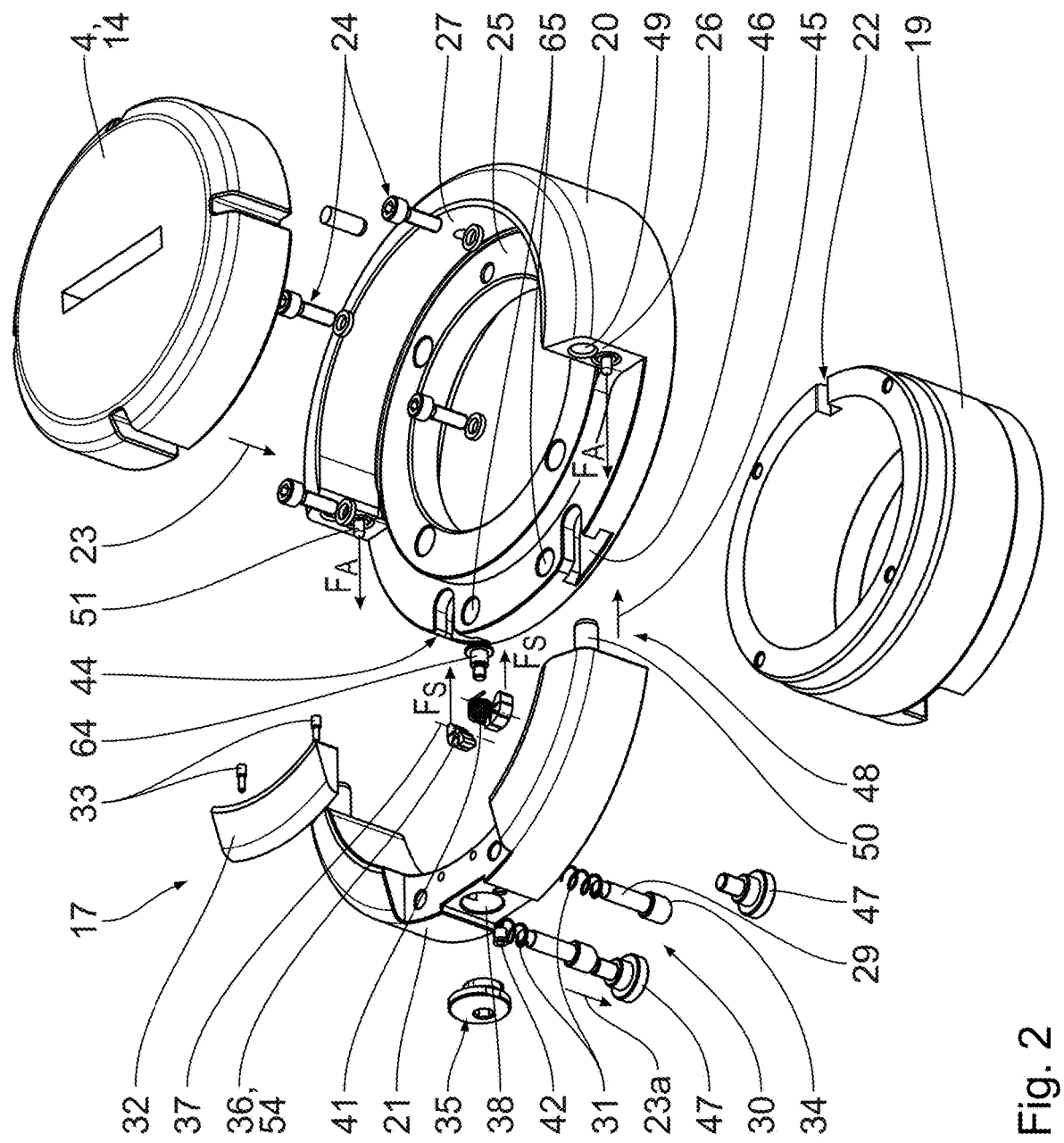
FIG. 2 shows an exploded illustration of the tool arrangement in FIG. 1 with the processing tool and a fastening device for connecting the processing tool to the magazine main body.

One of the tool arrangements 17 is shown in further detail in FIG. 2. The tool arrangement 17 comprises the fastening device for fastening the processing tool 4 designed as a punching die 14 on the machine tool 1 designed as a press device, in particular as a turret punch press. For this purpose, the fastening device 18 has a fastening main body 19, a counter clamping body 20 mounted thereon, and a closing body 21, which can be connected reversibly to the counter clamping body 20. The fastening main body 19 is rotatably mounted on the magazine main body 16 and can be driven in rotation relative thereto by means of a machine drive (not illustrated). The counter clamping body 20 is connected to the fastening main body 19 for conjoint rotation therewith. A main body connection between the fastening main body 19 and the counter clamping body 20 comprises a positive joint designed as a slot and key joint 22 for connecting the fastening main body 19 to the counter clamping body 20 for conjoint rotation about a processing direction 23. The processing direction 23 is oriented parallel to a direction of action of the ram 3. The main body connection furthermore comprises a plurality of screwed joints 24.

The counter clamping body 20 has a base flange 25 and an arc-shaped locating collar 26 connected thereto. The screwed joints 24 extend through the base flange 25. The locating collar 26 forms a contact surface 27 for clamping to the processing tool 3.

A clamping unit 28 and two locking elements 29 of a locking connection 30 are mounted in a captive manner on the closing body 21. The locking elements 29 can be mounted on the closing body 21 in such a way that they can be moved along an actuating direction 23a parallel to the processing direction 23. By means of locking springs 31, the locking elements 29 are preloaded in the direction of the counter clamping body 20. The locking elements 29 are mounted on a lock carrier 32. The lock carrier 32 interacts as a stop with the closing body 21 and limits the movability of the locking elements 29 along the actuating direction 23a. The locking elements 29 are mounted on the lock carrier 32 by means of fixing pins 33 oriented perpendicularly to the actuating direction 23a.

In an open state of the locking connection 30, the lock carrier 32 is arranged at a distance from the closing body 21. In a clamping state of the locking connection 30, the lock carrier 32 makes contact with the closing body 21.

The locking elements 29 have latching chamfers 34. The latching chamfers 34 ensure latching closure of the locking connection 30 to connect the clamping unit 28 to the counter clamping body 20. The lock carrier 32 is designed as an arc-shaped strip, which, together with the closing body 21 and the counter clamping body 20, forms a unit that is substantially rotationally symmetrical around the actuating direction 23.

The clamping unit 28 comprises an eccentric shaft 35 and two clamping elements 36 interacting therewith. The clamping elements 36 are each mounted so as to be rotatable about a deflection axis 37 oriented parallel to the actuating direction 23. By rotation of the clamping elements 36 around the deflection axis 37, they can be moved between the clamping position, in which the processing tool 4 is clamped against the counter clamping body 20, and an unlatched position, in which the processing tool 4 is released. A clamping force $F_S$ transmitted by the clamping elements 36 is perpendicular to the actuating direction 23.

The eccentric shaft 35 is rotatably mounted in a shaft bore 38 of the closing body 21. The eccentric shaft 35 interacts with the two clamping elements 36 via a clamping eccentric portion 39. The eccentric shaft 35 comprises an actuating engagement feature 40, which is designed as a positive locking profile, in particular as an internal hexagon profile. By driving the eccentric shaft 35 in rotation via the actuating engagement feature 40, the clamping forces $F_S$ can be applied to the processing tool 4 via the clamping elements 36.

The clamping unit 28 furthermore comprises a torsion spring 41 operatively connected to the eccentric shaft 35.

The torsion spring 41 is designed as a leg spring and preloads the eccentric shaft 35 in the direction of the clamping position.

The clamping unit 28 furthermore comprises a retaining means 42 for fixing the eccentric shaft 35 in the clamping position or in the open position. The retaining means 42 is designed as a pressure piece. In the clamping position or in the open position, the retaining means 42 in each case interacts with a retaining means engagement feature 43 of the eccentric shaft 35.

The fastening device 18 comprises a linear guide 44 for limiting the movability of the clamping unit 28 relative to the counter clamping body 20 along a joining direction 45. The joining direction 45 is oriented substantially parallel to the clamping force $F_S$. The linear guide 44 comprises two T-shaped guide slots 46 formed in the counter clamping body 20, in particular in the base flange 25. Two sliding elements 47 of the linear guide 44 for positive interaction with the guide slots 46 are mounted on the closing body 21. The linear guide 46 comprises a plug-in joint 48 with guide holes 49 in the counter clamping collar 26 and guide pins 50 that can be inserted therein on the closing body 21.

The fastening device 18 furthermore has two disengagement springs 51. The disengagement springs 51 exert disengagement forces $F_A$ between the closing body 21 and the counter clamping body 20 in order to move the closing body 21 counter to the joining direction 45 relative to the counter clamping body 20. The disengagement springs 51 are mounted on the counter clamping body 20, in particular being inserted into the locating collar 26.

Figure 3:
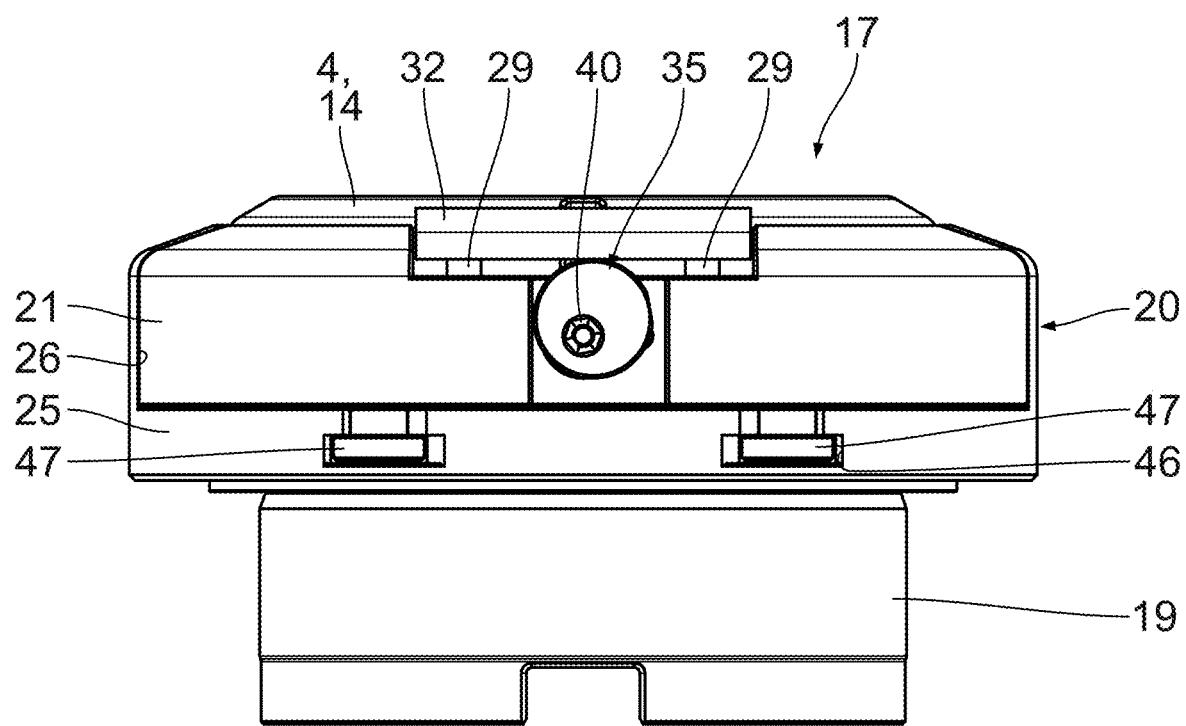
FIG. 3 shows a front view of the tool arrangement in FIG. 1, wherein a clamping unit and a locking connection of the fastening device are arranged in an open position.

In FIG. 3, the tool arrangement 17 is illustrated in a front view. The closing body 21 has been moved along the joining direction 45, and the closing body 21 is in contact with the locating collar 26. The sliding elements 47 are in engagement with the guide slots 46, and the guide pins 50 are in engagement with the guide holes 49. The lock carrier 32 and the locking elements 29 connected thereto are arranged in the unlatched position.

Figure 4:
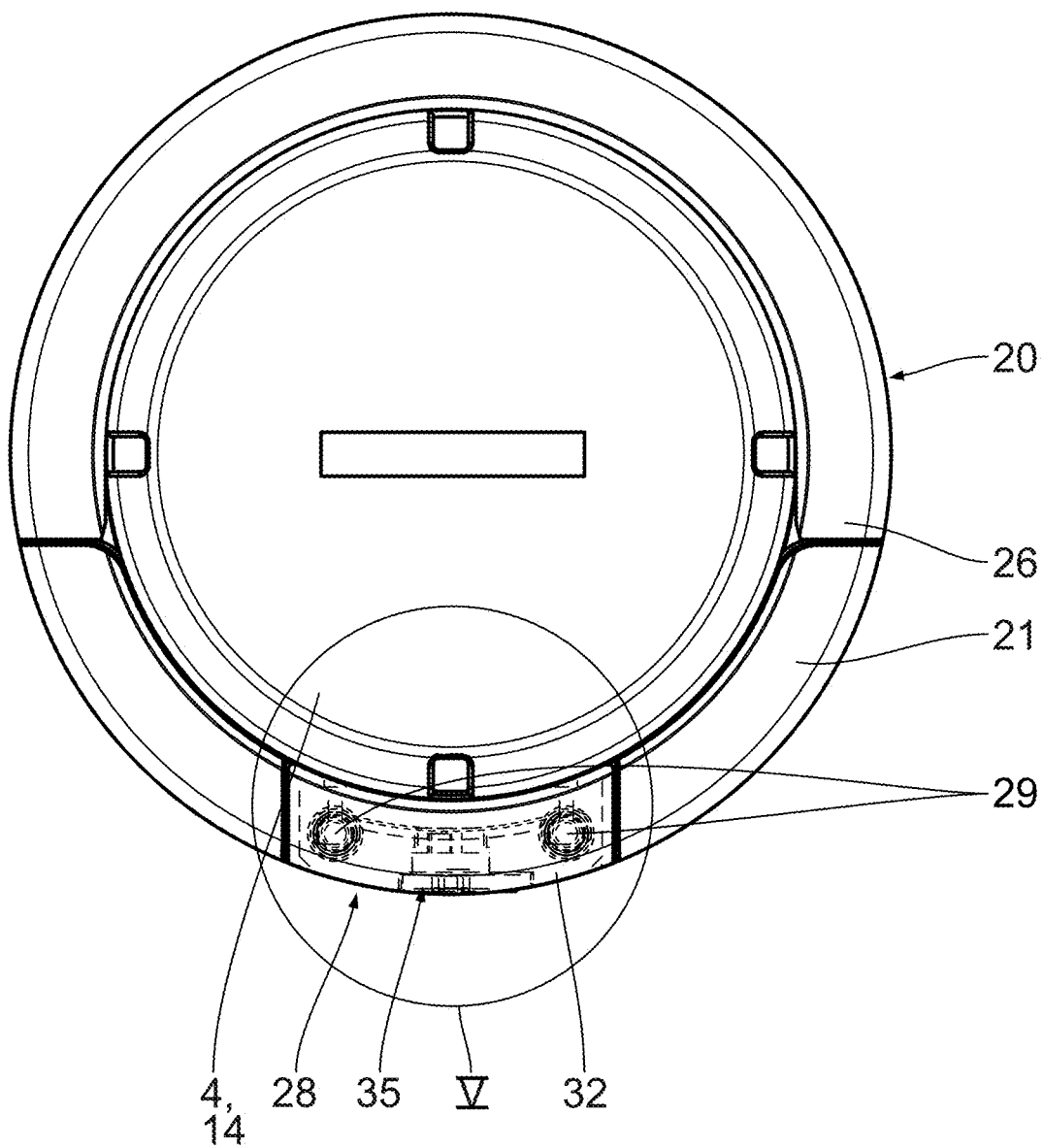
FIG. 4 shows a plan view of the tool arrangement in FIG. 1.
Figure 5:
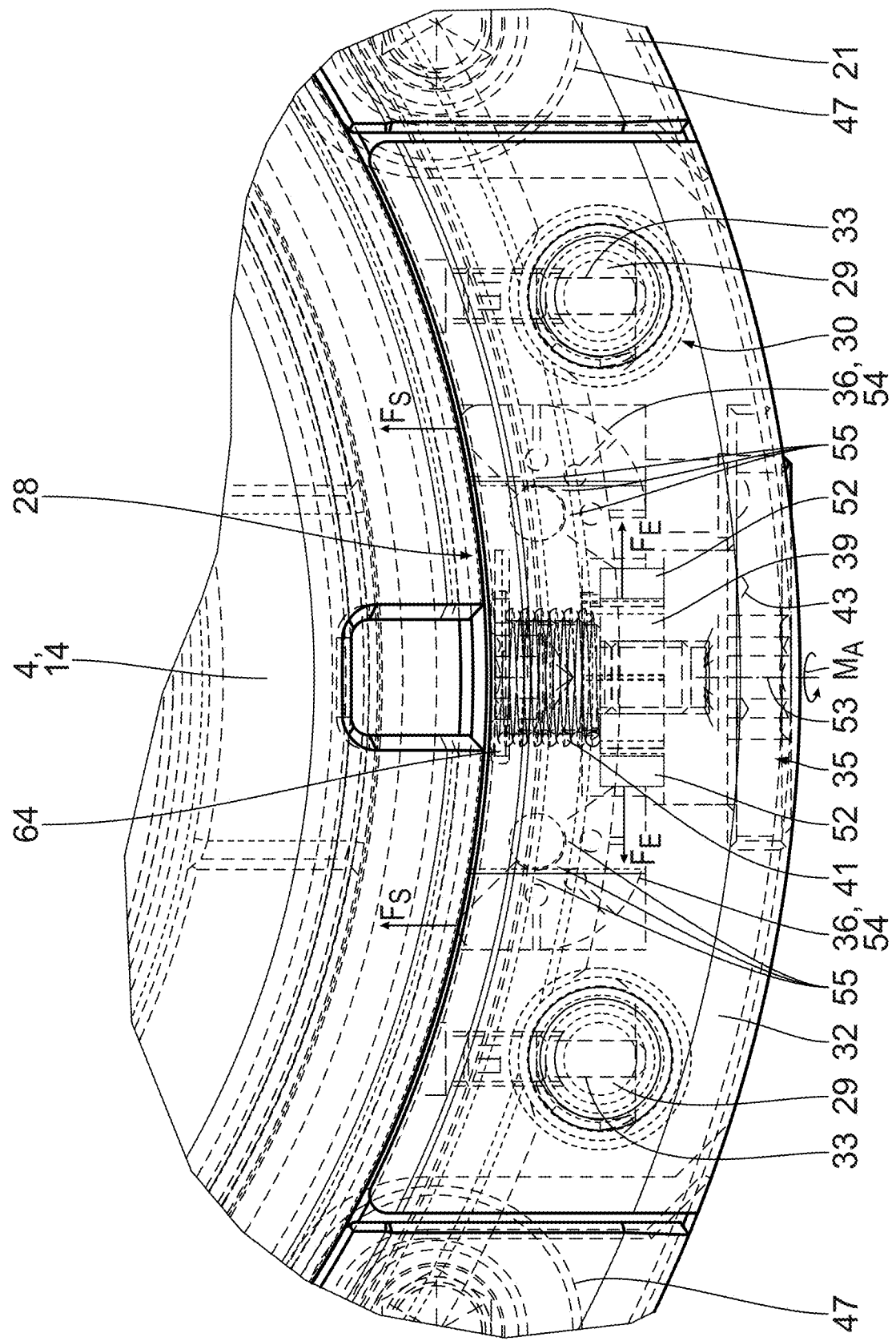
FIG. 5 shows a detail of the clamping unit and of the locking connection according to the detail V in FIG. 4, wherein concealed edges are illustrated by dashed lines and wherein the clamping unit has an eccentric shaft, which acts on the processing tool via two clamping elements.
Figure 6:
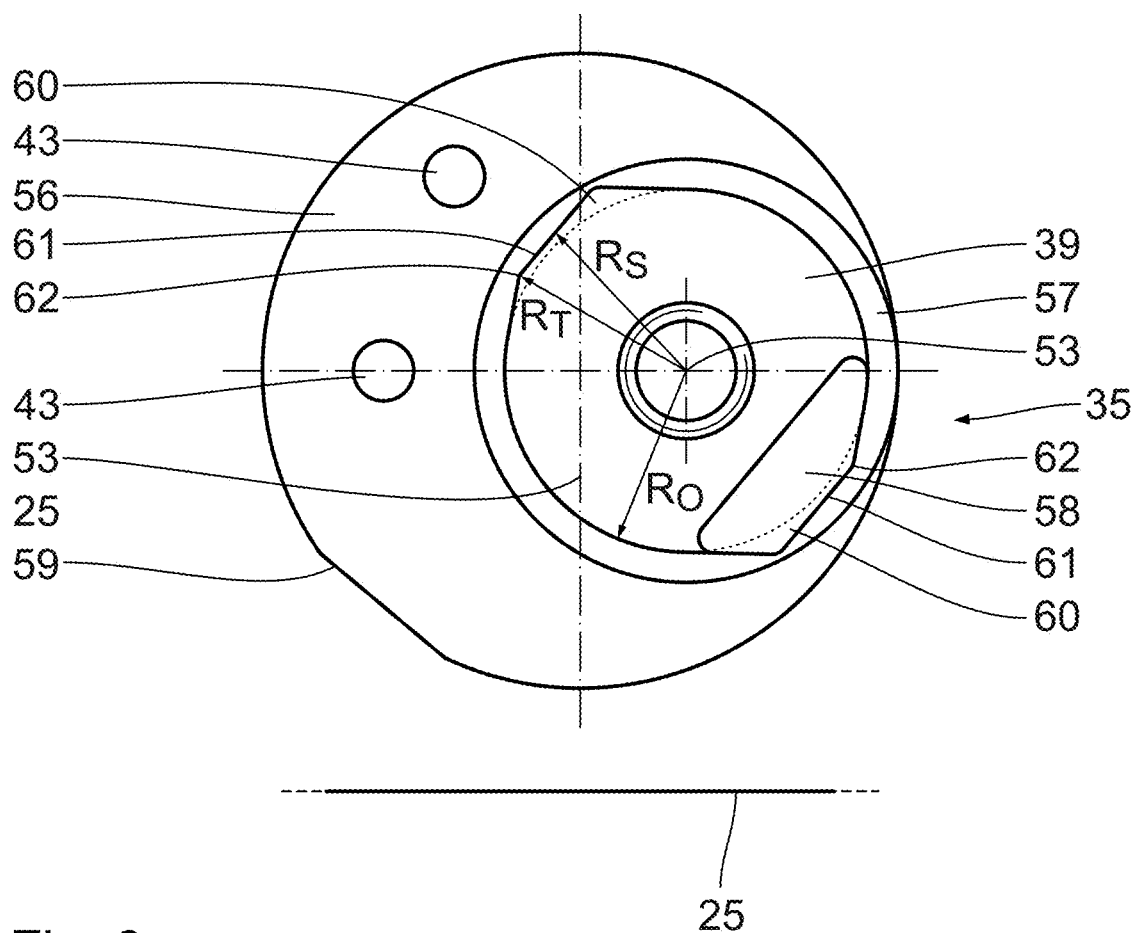
FIG. 6 shows a rear view of the eccentric shaft in FIG. 5, wherein the eccentric shaft comprises a bearing portion, a clamping eccentric portion and an opening eccentric portion.
Figure 7:
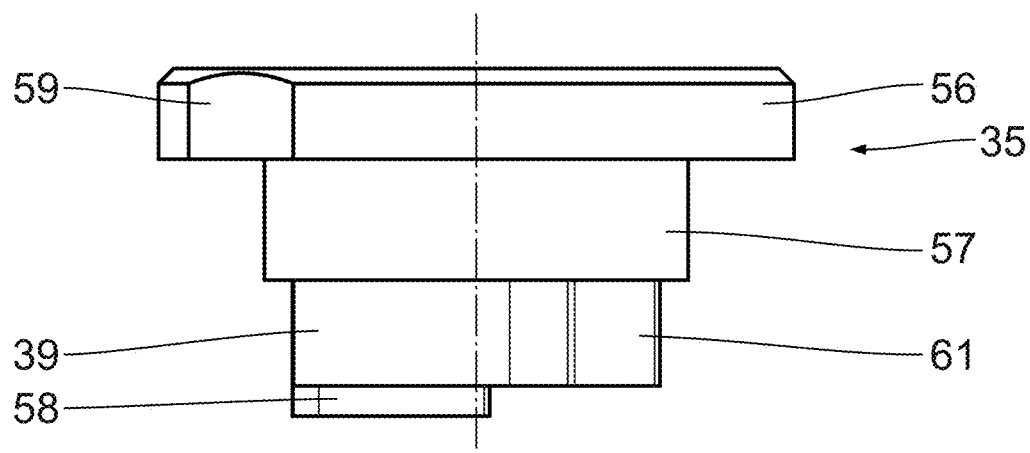
FIG. 7 shows a bottom view of the eccentric shaft in FIG. 5.
Figure 8:
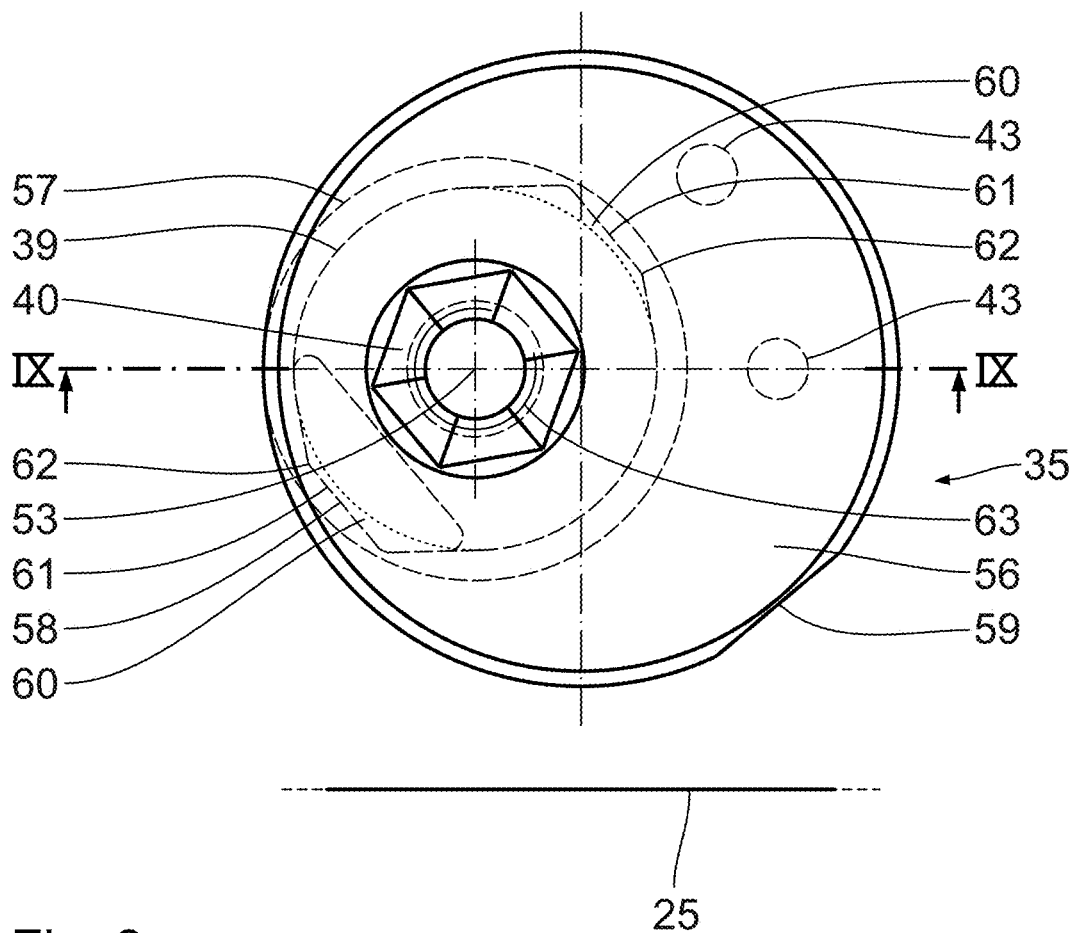
FIG. 8 shows a front view of the eccentric shaft in FIG. 5 with an actuating engagement feature for moving the fastening device between a clamping position and an open position.

The clamping unit 28 is shown in greater detail in FIG. 4 and FIG. 5. The locking connection 30 has been moved into the closed position, and the eccentric shaft 35 is in the clamping position. The clamping eccentric portion 39 of the eccentric shaft 35 acts on the respective clamping element 36 in each case via a linear contact body 52. The linear contact bodies 52 are designed as strips of rectangular cross section and are produced from a sliding bearing material, in particular from bronze.

The eccentric shaft 35 is designed to convert a drive torque $M_A$ into eccentric forces $F_E$ oriented perpendicularly to an eccentric axis 53. The eccentric forces $F_E$ are oriented substantially perpendicularly to the clamping forces $F_S$. The clamping elements 36 are designed as deflection means 54 for deflecting the eccentric forces $F_E$ to produce the clamping forces $F_S$. For this purpose, the clamping elements 36 are mounted so as to be rotatable about the deflection axes 37, as described above.

The clamping elements 36 comprise spring means 55 for the resilient transmission of the clamping forces $F_S$ to the processing tool 4. The spring means 55 are designed as bending springs, in particular in the form of solid body joints. Each of the clamping elements 36 comprises three of the spring means 55. In particular, the clamping elements 36 are of slotted design to bring about the spring action, wherein a slot base of the respective slot is enlarged to form a hole in order to promote the spring action and reduce stress peaks.

The eccentric shaft 35 is shown in greater detail in FIG. 6 to FIG. 9. The eccentric shaft 35 comprises, in succession, an opening eccentric portion 56, a bearing portion 57 for the rotatable mounting of the eccentric shaft 35 on the shaft bore 38, the clamping eccentric portion 39, and a torsion spring engagement feature 58 for connection to the torsion spring 41 for conjoint rotation therewith about the eccentric axis 53.

The eccentric shaft 35 comprises a rotation stop 59. The rotation stop 59 is arranged on the opening eccentric portion 56. In the clamping position, the rotation stop 59 comes into contact with the base flange 25 and prevents rotation of the eccentric shaft 35 beyond the clamping position.

The clamping eccentric portion 39 comprises two eccentric cams 60. A clamping radius $R_S$ in a clamping region 61 of the respective eccentric cam 60 is greater than an opening radius $R_O$ of the clamping eccentric portion 39 with respect to the eccentric axis 53. A dead centre radius $R_T$ of a dead centre 62 is, in turn, greater than the clamping radius $R_S$. In the clamping position, the clamping region 61 is in contact with the linear contact body 52. By virtue of the fact that the opening radius $R_O$ is greater than the clamping radius $R_S$, an energy peak has to be overcome during the movement of the eccentric shaft 35 between the clamping position and the open position. The clamping position thus represents a stable position of the eccentric shaft 35.

Figure 9:
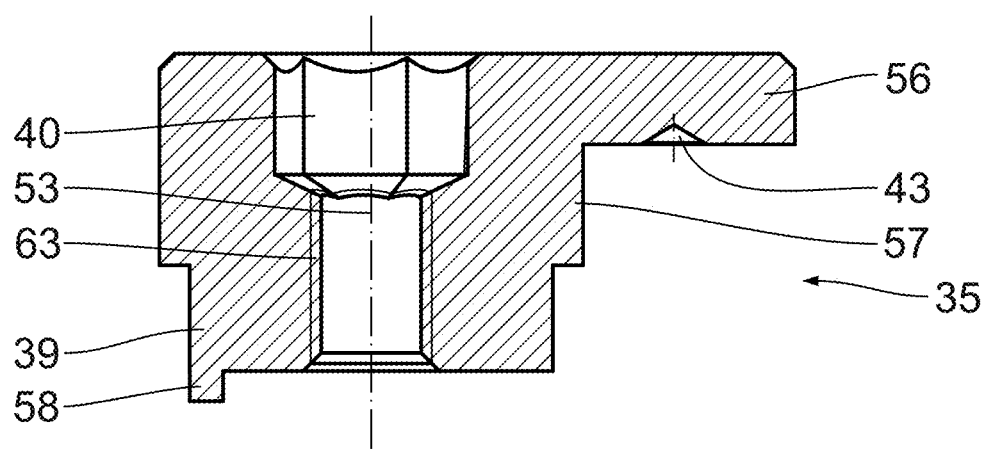
FIG. 9 shows a section through the eccentric shaft along section line IX-IX in FIG. 8 with a retaining means engagement feature for fixing the clamping unit in the clamping position.

In FIG. 9, the eccentric shaft 35 is illustrated in section. A thread 63 is used to fasten the eccentric shaft 35 on the closing body 21 by means of a connecting screw 64. The torsion spring 41 is rotatably mounted on a screw stem of the connecting screw 64.

The operation of the machine tool 1, of the tool magazine 3, of the tool arrangement 17 and of the fastening device 18 is as follows:

The counter clamping body 20 is connected to the magazine main body 16 for conjoint rotation therewith via the fastening main body 19. The closing body 21 has been removed from the counter clamping body 20. The clamping unit 28 is in the open position. The spring means 55 are relaxed, and the retaining means 42 is in engagement in one of the retaining means engagement features 43.

The punching die 14 is inserted into the counter clamping body 20 from the side, in particular along the joining direction 45. The punching die 14 rests against the contact surface 27. Insertion of the processing tool 4 from the side ensures that the loading of the processing tool is possible even if there is not sufficient installation space for vertical loading in a vertical direction.

The closing body 21 is guided by the linear guide 44 along the joining direction 45 in the direction of the counter clamping body 26. During this process, the sliding elements 47 engage in the guide slots 46, and the guide pins 50 engage in the guide holes 49.

The latching chamfers 34 come into contact with the fastening body 19. Moving the closing body 21 further in the joining direction 45 brings about movement of the locking elements 29 into the unlatched position, in particular counter to the actuating direction 23. The locking springs 31 are stressed. The lock carrier 32 moves out of contact with the closing body 21 and is raised upwards. The disengagement springs 51 come into contact with the closing body 21 and are stressed.

In a plan view, the locking elements 29 come into overlap with locking holes 65 in the counter clamping body 20, in particular in the fastening main body 19, in particular along the actuating direction 23. The locking elements 29 latch into the locking holes 65. During this process, the locking elements 29 are moved along the actuating direction 23*a* by means of the locking springs 31, together with the lock carrier 32. The lock carrier 32 comes into contact with the closing body 21. The locking connection 30 is in the closed position. An upper edge of the lock carrier 32 is arranged flush with an upper edge of the closing body 21. This arrangement indicates to the user that the locking connection 30 is in the closed position.

An actuating tool, in particular a hexagon wrench, is brought into engagement with the actuating engagement feature 40. Via the actuating engagement feature 40, a drive torque $M_A$ is transmitted to the eccentric shaft 35, whereby the eccentric shaft 35 is rotated. The respective linear contact body 52 comes into contact with the respective eccentric cam 60. The eccentric forces $F_E$ are thereby transmitted to the linear contact body 52. Via the deflection means 54, the respective eccentric force $F_E$ is converted into the clamping force $F_S$. During this process, the clamping force $F_S$ is transmitted via the deflection means 54, and the spring means 55 are stressed.

The linear contact body 52 comes into contact with the dead centre 62. The maximum clamping force $F_S$ is achieved. As the eccentric shaft 35 is rotated further, the linear contact body 52 comes into contact with the clamping region 61. During this process, the clamping force $F_S$ is slightly reduced, and the eccentric shaft 35 is in a stable position. The clamping position has been reached.

The rotation stop 59 is in contact with the fastening main body 19. Further rotation of the eccentric shaft 35 is thereby prevented. In particular, the eccentric shaft 35 is fixed in the clamping position by the dead centre 62 and the rotation stop 59.

The punching die 14 is clamped to the counter clamping body 20 by means of the clamping force $F_S$. The punching die 14 can be used to process a workpiece 6. The eccentric shaft 35 is additionally secured in the clamping position by means of the retaining means 42, which is in engagement with the retaining means engagement feature 43 of the eccentric shaft 35.

The workpiece 6 is arranged on the work table 5 and connected to the clamping means 9. The tool pair 15 is arranged below the ram 12, and the workpiece 6 is processed by the tool pair 15, being driven by the actuating device 11.

To remove the punching die 14 from the fastening device 18, the eccentric shaft 35 is moved into the open position by means of the actuating tool via the actuating engagement feature by the application of an opposite drive torque $M_A$. By means of the drive torque $M_A$ introduced, the eccentric shaft 35 is rotated, wherein the dead centre 62 is overcome. The linear contact body 52 is moved into the region of the opening radius $R_O$, and the spring means 55 are relaxed. The punching die 14 is free from clamping forces $F_S$. The clamping unit 28 is in the open position. To secure the open position, the retaining means 42 engages in the associated retaining means engagement feature 43.

To release the locking connection 30, the eccentric shaft 35 is rotated further. The torsion spring 41 is stressed. The opening eccentric portion 56 comes into contact with the lock carrier 32. Further rotation of the eccentric shaft 35 results in raising of the lock carrier 32 together with the locking elements 29. The locking connection 30 is in the unlatched position. The locking elements 29 disengage from the locking holes 65.

The disengagement forces $F_A$ provided by the disengagement springs 51 result in movement of the closing body 21 counter to the joining direction 45. The locking elements 29 move out of overlap with the locking holes 65 along the actuating direction 23*a*. The actuating tool can be removed from the actuating engagement feature 40. The closing body 21 is separated from the counter clamping body 20 along the linear guide 45. The torsion spring 41 causes movement of the eccentric shaft 35 back into the open position, and the retaining means 42 secures the eccentric shaft 35 in the open position.

The punching die 14 can be removed from the fastening device 18. The machine tool 1 is in the initial position again. The fastening device 18 is once again ready for the loading of a punching die 14.

The tool magazine 3, the tool arrangement 17 and the fastening device 18 advantageously ensure that the processing tool 4 can be loaded into the machine tool 1 in a particularly simple and effective manner. By virtue of the fact that the clamping unit 28 is connected to the counter clamping body 20 by means of a locking connection 30, the processing tool 4 can be connected to the machine tool 1 in a manner which is particularly efficient in terms of time. The design of the locking connection 30 as a latching connection ensures particularly simple fastening of the processing tool 4 on the machine tool 1, in particular with just one hand. The release of the locking connection 30 by means of the eccentric shaft 35, and the movement of the closing body 21 into a position at a distance from the counter clamping body 20 by means of the disengagement springs 51, make the fastening device 18 even easier to handle. The tool magazine 3, the tool arrangement 17 and the fastening device 18 ensure particularly time-efficient changing of processing tools 4 and particularly reliable connection of the processing tool 4 to the machine tool 1 and thus economical operation of the machine tool 1.

What is claimed is:

1. A fastening device for fastening a processing tool to a machine tool, comprising:
   at least one counter clamping body, against which the processing tool can be clamped;
   a clamping unit for releasably clamping the processing tool to the at least one counter clamping body; and
   a locking connection for releasably connecting the clamping unit to the at least one counter clamping body,
   wherein the locking connection comprises at least one locking element, which can be brought into engagement with at least one locking engagement feature, and which is a locking bolt,
   wherein the clamping unit and the locking connection are designed in such a way that a provision of a clamping force and the connection of the clamping unit to the at least one counter clamping body are accomplished independently of one another, so that the clamping force does not have to be overcome to connect the clamping unit to the at least one counter clamping body.

2. The fastening device according to claim 1, wherein the processing tool is fastened to a press device.

3. The fastening device according to claim 1, wherein the clamping unit and at least one of
   the at least one locking element of the locking connection or
   the at least one locking engagement feature of the locking connection
   are mounted on a closing body.

4. The fastening device according to claim 1, wherein the locking connection comprises a latching connection for the latching connection of the clamping unit to the at least one counter clamping body.

5. The fastening device according to claim 1, further comprising a linear guide for limiting movability of the clamping unit relative to the at least one counter clamping body along a joining direction.

6. The fastening device according to claim 1, wherein the clamping unit has at least one spring means, via which a clamping force for clamping the processing tool is transmitted.

7. The fastening device according to claim 1, wherein the locking connection comprises at least two of the locking elements or the clamping unit comprises at least two clamping elements for clamping the processing tool to the at least one locating body.

8. The fastening device according to claim 1, wherein the clamping unit comprises an actuating engagement feature for manually operated movement of the fastening device between a clamping position and an open position.

9. The fastening device according to claim 1, wherein the clamping unit comprises an eccentric shaft having a clamping eccentric portion for converting a drive torque into a clamping force for clamping the processing tool.

10. The fastening device according to claim 1, wherein the clamping unit has a stable position in a clamping position, in which the processing tool is clamped to the counter clamping body.

11. The fastening device according to claim 1, wherein the clamping unit comprises at least one deflection means for deflecting a driving movement by at least 45° into a clamping movement acting on the processing tool.

12. The fastening device according to claim 1 comprising at least one retaining means for fixing the clamping unit in a clamping position or an open position.

13. The fastening device according to claim 1, wherein the processing tool is a press die or a forming die.

14. A tool arrangement for a machine tool, comprising:
the fastening device according to claim 1; and
a processing tool for processing a workpiece,
wherein the clamping unit is releasably connected to the at least one counter clamping body by means of the locking connection, and
wherein the processing tool is releasably clamped to the at least one counter clamping body by means of the clamping unit.

15. The tool arrangement as claimed in claim 14, wherein the machine tool is a press device.

16. A tool magazine, comprising:
a magazine main body; and
a plurality of tool arrangements according to claim 13 mounted on the magazine main body.

17. A method for operating a machine tool, comprising the following steps:
providing a machine tool having a fastening device as in claim 1,
providing a processing tool for processing a workpiece,
arranging the processing tool at the at least one counter clamping body,
arranging the clamping unit at the at least one counter clamping body,
closing the locking connection to connect the clamping unit to the at least one counter clamping body,
clamping the processing tool to the at least one counter clamping body by the clamping unit, and
processing the workpiece by the processing tool.

* * * * *